United States Patent [19]
Baret et al.

[11] Patent Number: 5,544,939
[45] Date of Patent: Aug. 13, 1996

[54] BUCKET SEAT AND ITS APPLICATION TO A LAND-BASED MOTOR VEHICLE

[75] Inventors: Frédéric Baret, Montargis; François Faurrey, Montbeliard, both of France

[73] Assignee: Cesa- Compagnie Europeenne de Sieges pour Automobiles, Perret Cedex, France

[21] Appl. No.: 240,595

[22] Filed: May 10, 1994

[30] Foreign Application Priority Data

May 10, 1993 [FR] France ................................ 93 05590

[51] Int. Cl.$^6$ ............................ A47C 1/023; B60N 2/10; B60N 2/14
[52] U.S. Cl. .............. 297/340; 297/344.25; 297/378.12; 297/378.14; 297/452.35
[58] Field of Search ............................ 297/337, 344.21, 297/344.22, 344.23, 378.1, 378.12, 344.25, 452.35, 452.36, 341, 378.14

[56] References Cited

U.S. PATENT DOCUMENTS

| | | | |
|---|---|---|---|
| 2,576,004 | 11/1951 | Fair | 297/337 |
| 3,207,464 | 9/1965 | Hrach | 248/417 X |
| 3,973,799 | 8/1976 | Berg | 297/344.22 |
| 4,775,187 | 10/1988 | Herr | 297/452.36 |
| 4,822,099 | 4/1989 | Negi et al. | 297/344.22 |

FOREIGN PATENT DOCUMENTS

| | | |
|---|---|---|
| 293620 | 7/1928 | United Kingdom . |
| 857317 | 12/1960 | United Kingdom . |
| WO9209451 | 6/1992 | WIPO . |

OTHER PUBLICATIONS

Patent Abstracts of Japan, vol. 5, No. 183 (M–97), Nov. 2, 1981 & JP–A 56103628.

*Primary Examiner*—Peter M. Cuomo
*Assistant Examiner*—Anthony D. Barfield
*Attorney, Agent, or Firm*—Sughrue, Mion, Zinn, Macpeak & Seas

[57] ABSTRACT

The bucket seat comprising a seat part (10) with a cushion (11) carried by a framework (12) mounted on a subframe (14), a backrest (20) with a cushion (21) carried by a framework (22), and an articulation (30) connecting the subframe (14) of the seat part (10) to the framework (22) of the backrest (20) in order to allow the cushion (21) of the backrest (20) to be pivoted, is characterized in that the framework (12) of the seat part (10) cushion (11) is mounted on the subframe (14) by the interposition of a turntable (13) and in that the seat part and backrest cushions (11,21) each comprise a surface (110) which is conjugate with a complementary surface (210) which fit together at least partially on one another.

Application in particular to vehicles known as coupes.

7 Claims, 6 Drawing Sheets

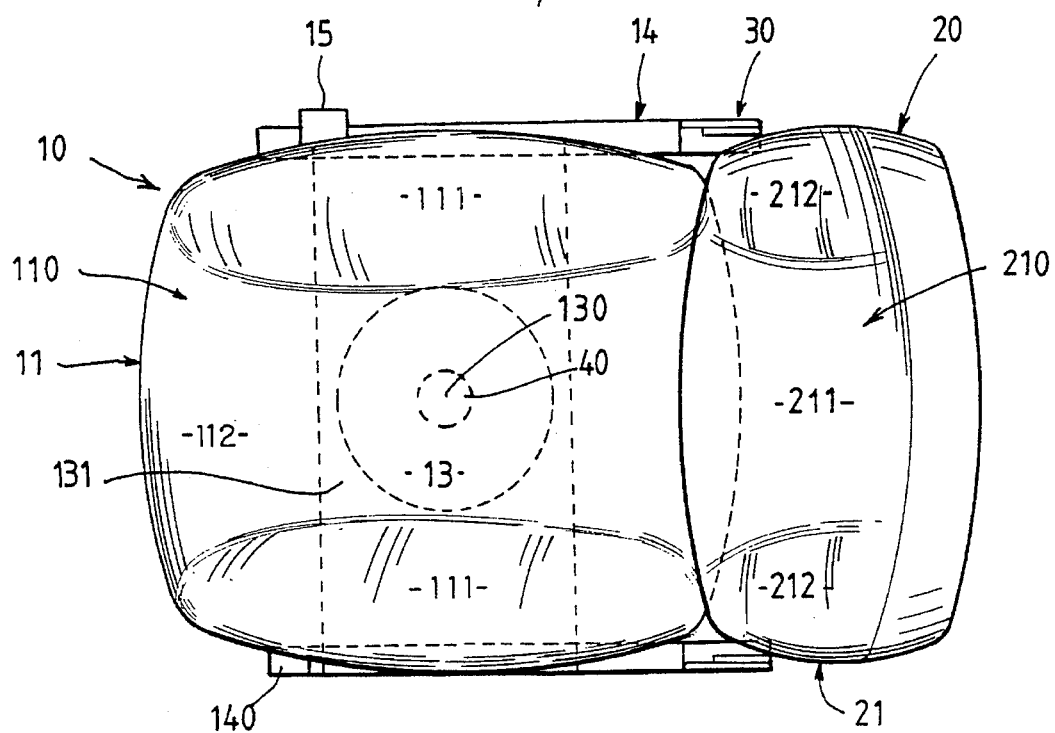
FIG.1
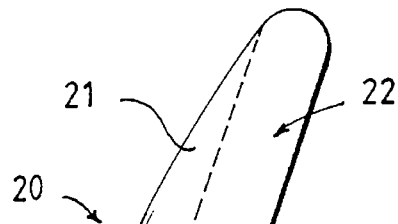
FIG.2
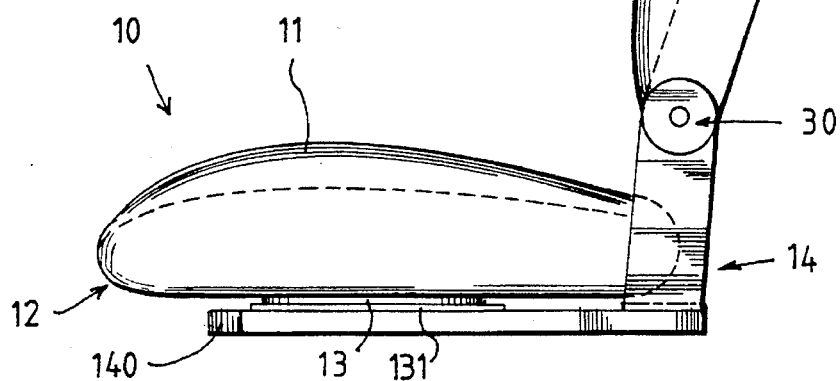

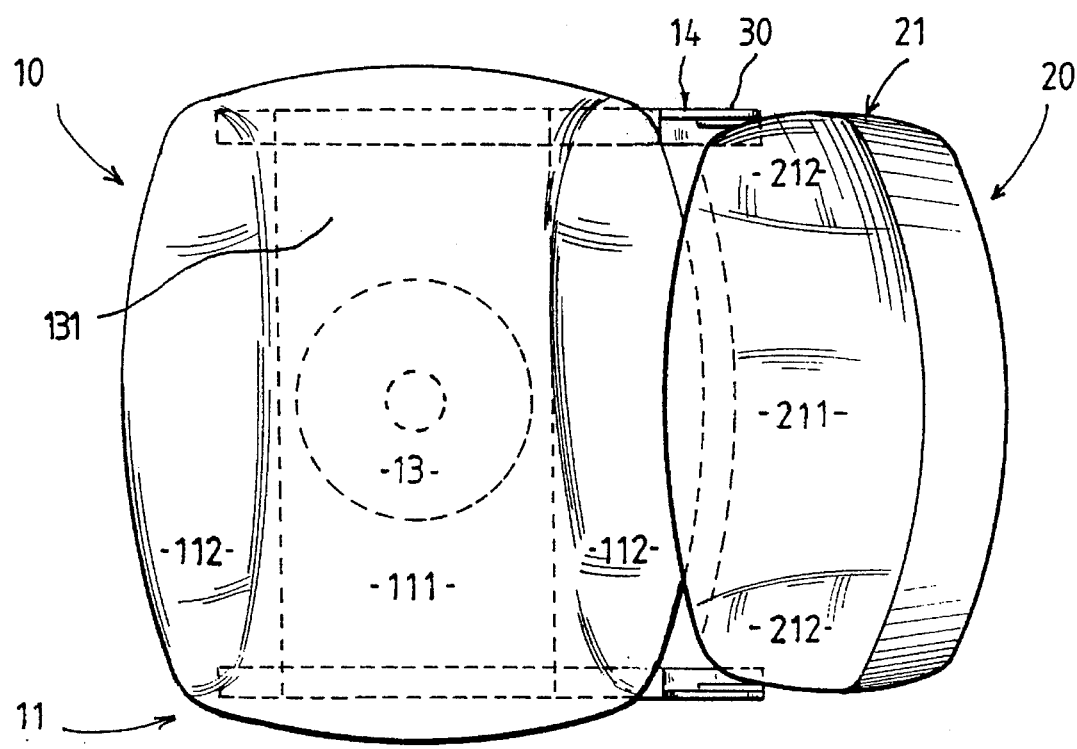
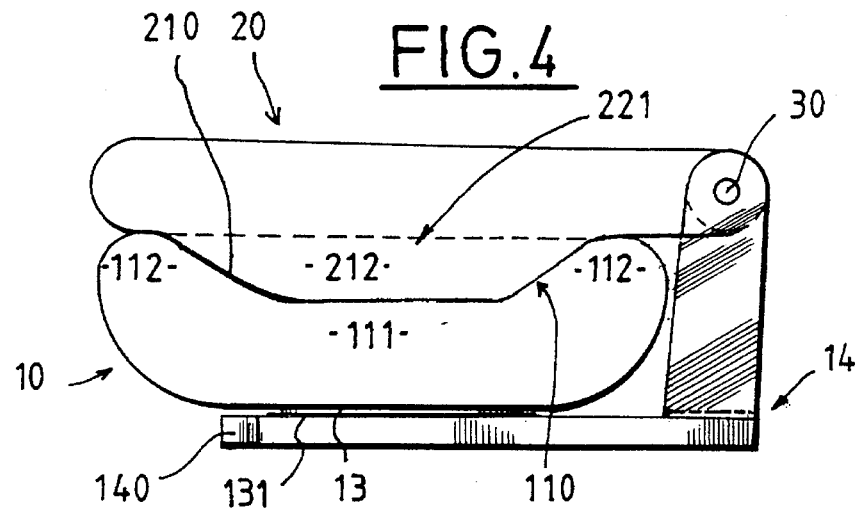

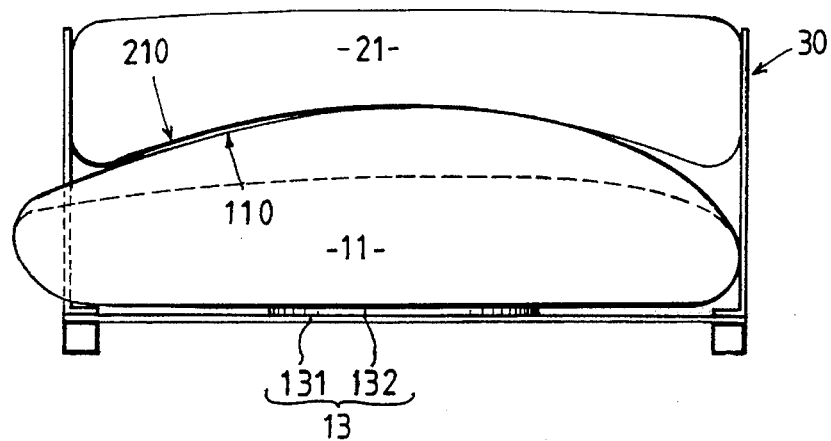
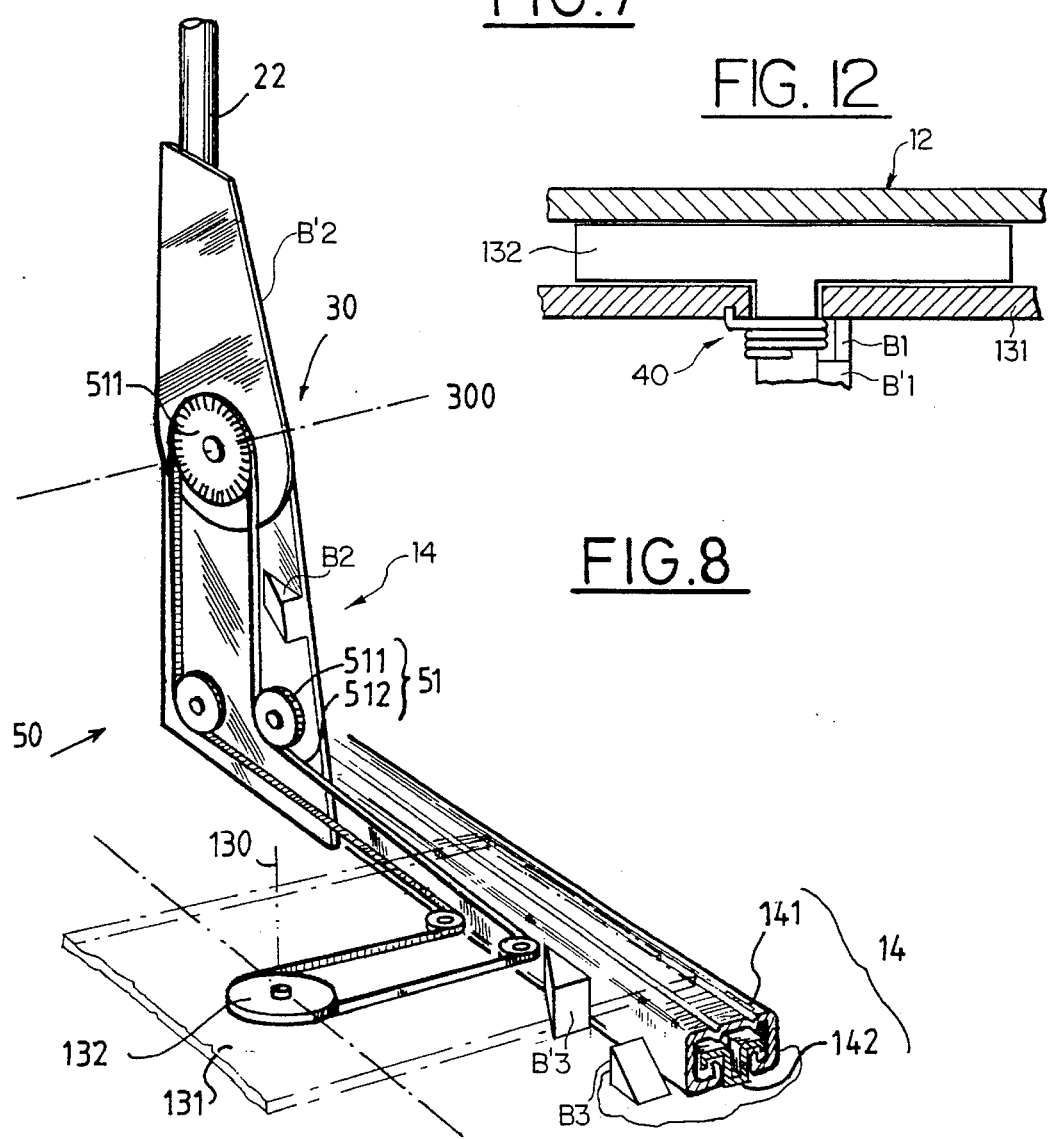

1

BUCKET SEAT AND ITS APPLICATION TO A LAND-BASED MOTOR VEHICLE

The present invention relates to a seat and, more particularly, to a bucket seat which can be folded and possibly retracted for a motor vehicle and quite specially for a land-based motor vehicle.

The object of the invention is the obtaining of a seat for a motor vehicle which is comfortable, because it gives excellent lateral support, which allows easy access for its occupant, and if need be permits easy accessibility to that which is located behind the seat and also, as required, which allows use of a part of the seat as a small table to act as a writing desk or to support objects.

Bucket seats are known for land-based motor vehicles and, in particular, for those vehicles with sporting tendencies, the shell or structure of which is, in general, equipped with just two side-access doors, each one placed on one of the two opposite sides of the vehicle. These seats are usually equipped with a seat part cushion and with a backrest cushion which exhibit lateral padded rolls delimiting hollow shapes, conducive to holding the occupants effectively when they are subjected to transverse or lateral forces such as those produced especially when taking corners of relatively short radius at high speed. These seats are furthermore often equipped so as, depending on the case, either to allow the backrest to be folded down against the seat part, or to allow the whole of the seat—backrest and seat part together, to be tipped forwards, or one or other of these two movements, additionally associated with a forward movement towards the dashboard of the whole of the seat or of its seat part in order to make access to the rear of the vehicle especially to the rear seats, easier.

This type of seat with lateral padded rolls and fold-down backrest, although offering advantages, is not, in spite of this, without drawbacks. Indeed, it will be noted that the presence of the lateral padded rolls, especially on the seat part, constitutes a considerable hindrance which creates difficulties for getting into or out of the seat. What is more, it will also be noted that this presence of lateral padded rolls both on the seat part and backrest cushions distinctly limits the amplitude of the angle to which the backrest can be folded down against the seat part which, in consequence, in the same way limits the size of the passage released in order to gain access to the rear of the seat.

The object of the invention is to overcome this type of difficulty.

The subject of the invention is a bucket seat for a motor vehicle which comprises a seat part with a cushion carried by a framework mounted on a subframe, a backrest with a cushion carried by a framework, and an articulation which connects the subframe of the seat part to the framework of the backrest in order to allow the cushion of the backrest to be pivoted about an axis between a first, upright, position and a second, folded-down, position in which the cushion of the backrest is against the cushion of the seat part. This seat is noteworthy in that the framework of the seat part cushion is mounted on the subframe by the interposition of a turntable so that the seat part cushion can turn about an axis which is not parallel with the axis of pivoting of the backrest cushion between a normal position and a turned access position and in that the seat part and backrest cushions each comprise a middle supporting face and lateral padded rolls which border it and in that this middle supporting face and these lateral padded rolls of the seat part cushion delimit a surface which is conjugate with a complementary surface delimited by this middle supporting face and these lateral padded rolls of the backrest cushion so that when the seat part cushion occupies its turned access position and the backrest cushion occupies its second, folded-down, position, the corresponding surfaces of the seat part cushion and of the backrest cushion are at least partially fitted on to one another.

The subject of the invention is also the application of a seat of the type indicated before to a land-based motor vehicle.

Other characteristics of the invention will emerge from reading the description and the claims which follow as well as examining the figures of the appended drawing, giving solely by way of example, in which:

FIG. 1 is a diagrammatic plan view of one embodiment of a seat according to the invention with its seat part cushion in the position known as normal and its backrest cushion in the position known as first, upright, position;

FIG. 2 is a diagrammatic side view of the seat of FIG. 1;

FIG. 3 is a view similar to that of FIG. 1 in which the seat part cushion has turned relative to the backrest cushion in order to assume its position known as turned access position;

FIG. 4 is a view analogous to that of FIG. 3, but in which the backrest cushion is furthermore in its position known as second, folded-down, position, applied against the seat part;

FIG. 7 is a view analogous to those of FIGS. 4 and 6 but now observed head on and no longer from the side;

FIG. 8 is a diagrammatic partial perspective view of a part of an embodiment of a seat according to the invention;

Figure 5:
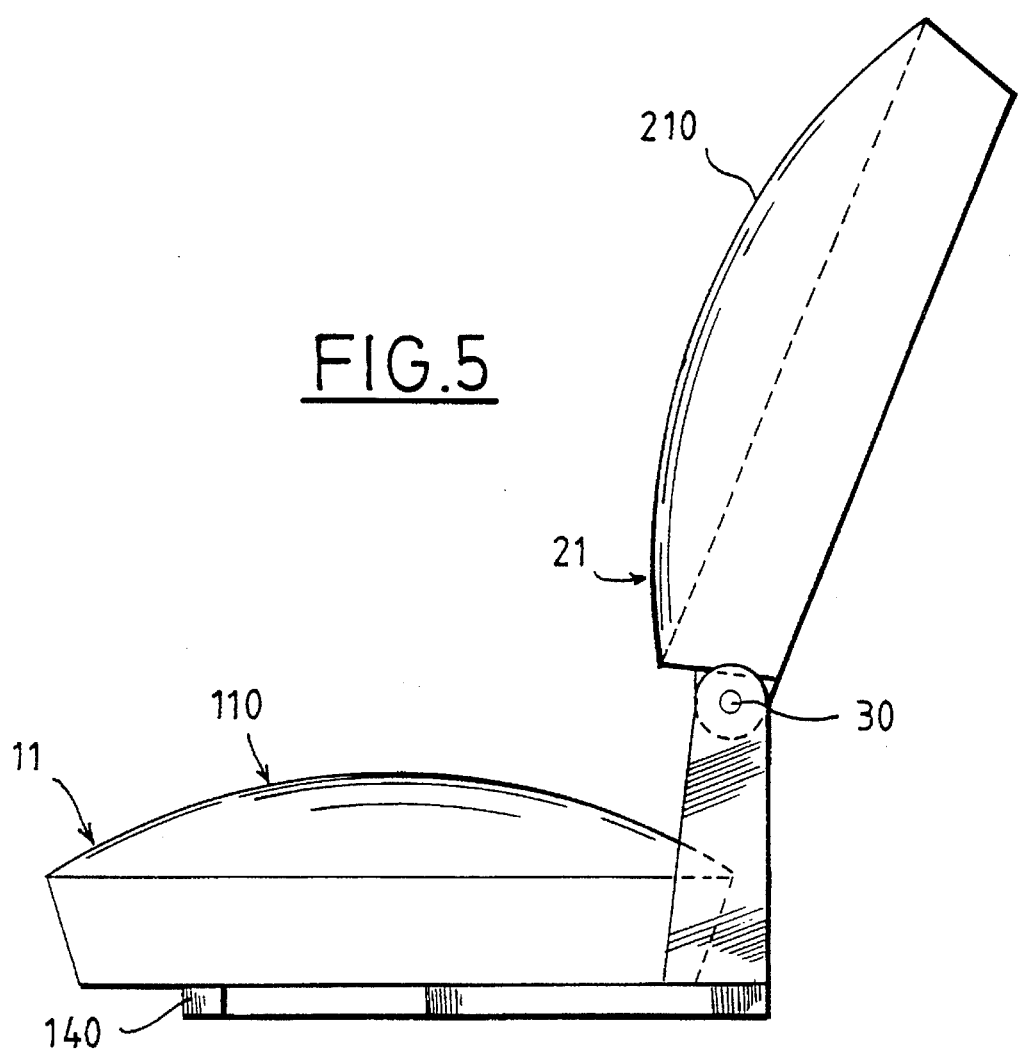
FIG. 5 is a view analogous to those of FIG. 2 of another embodiment.

Since seats in general, and more especially seats for motor vehicles, especially land-based motor vehicles in particular are well known in the art, that which follows will describe only that which relates directly or indirectly to the invention. For the remainder, the expert in the technical field in question will delve into the common conventional solutions at its disposal in order to face up to the particular problems with which he is confronted.

In that which follows, one and the same reference numeral will always be used to identify an homologous element, regardless of the embodiment or its implementational variant.

For the convenience of the explanation, each of the constituent parts of a seat according to the invention will be described in succession before the manufacture thereof, if need be, and the assembly and operation thereof are explained.

In that which follows, a seat according to the invention will be described for its specific application to a land-based motor vehicle. All the indications relating to the orientation of the seat, such as vertical, horizontal, lateral, transverse, longitudinal, for example, are made with respect to the conventional axes of orientation of a vehicle, in the knowledge that "normal" is qualified as being the position for which the seat occupies a configuration in which, when it is occupied, the person sitting in it is facing the road in the direction of the windscreen. It is, however, obvious that such an application is not the only one possible.

As can be seen, a seat according to the invention essentially comprises a seat part 10, a backrest 20, an articulation 30 in order to allow the backrest to be pivoted relative to the seat part and, if required, to allow its inclination to be modified and, if need be, a return device 40 and an automatic-control device 50.

The seat part 10 comprises a cushion 11 carried by a framework 12 which is mounted by the interposition of a turntable 13 which can move in terms of rotation about an axis 130, for example preferably vertical, relative to a subframe 14 intended to rest on a floor or flooring which is not represented. The turntable 13 of any common conventional type, for example with a ball bearing or with a plain bearing, comprises a semi-fixed element 131 secured to the subframe 14 and a moving element 132 secured to the framework 12 of the cushion 11. In that way, the moving element 132 can turn about the axis 130 with respect to the semi-fixed element 131. The axis 130 is defined by a pivot of any appropriate known type. The subframe 14, which serves as some sort of underframe, is associated with the floor or flooring, for example via a connection 140 of any known conventional type, such as hinges or hinge pins or the like, which, if need be, allows the whole of the seat to be tilted forward about an axis, for example orthogonal to the axis 130. The subframe is kept against the flooring with the aid of a lock. The subframe 14 is, for example, made up of a slideway of any conventional type which comprises a slide 141 to which is fixed the semi-fixed element 131 of the turntable 13 and an appropriate base 142 which is connected to the flooring if required by interposition of the connection 140; these various components are represented very diagrammatically in the figures. The slideway, as is known, makes it possible longitudinally to adjust the position of the seat with respect to the flooring in order to adapt this position to the morphology of its occupant, to the comfort which he is seeking and, if required, to his style of driving if this concerns the driver's seat. The slideway is immobilized in the chosen position with the aid of a catch or the like. If required, this slideway is of a type known as "having a memory" which makes it possible to place the seat automatically back in the longitudinal position in which it had been placed beforehand if the latter has been moved forward in order to facilitate access to the seats or volume situated behind it. One embodiment of a slideway with memory is consequently described in document FR 2,631,592.

Appropriate limit stops judiciously located serve to hold the seat part cushion, for example, in its turned access position, the backrest cushion, for example, in its second, folded-down, position, and the slideway or slideways in its (their) fully forward position.

The presence of the turntable 13, interposed between the framework 12 of the seat part 10 cushion 11 and the subframe 14 makes it possible to pivot the cushion, for example through approximately 90° between a normal position, known as road-going position, and a turned position, known as access position, after a rotation of the order of the a quarter of a turn in one direction or the other depending on whether this concerns the nearside or the offside seat. A lock 15 of any appropriate suitable type makes it possible to immobilize the seat part 10 cushion 11 in one or other of its two positions and, preferably, in its normal position known as road-going position.

The backrest 20 essentially comprises a cushion 21 carried by a framework 22.

The articulation 30 connects the subframe 14 of the seat part 10 to the framework 22 of the backrest 20. This articulation makes it possible to pivot the cushion of the backrest about an axis 300, nonparallel to the axis 130 of rotation of the seat part cushion and, for example, orthogonal or approximately so relative to this axis 130. The backrest cushion can therefore assume a first, upright, position in which an occupant can rest his back against it and a second, folded-down, position, in which the backrest cushion is applied against the seat part cushion.

This articulation 30 of any appropriate known conventional type comprises flanges which are connected, in the case of some of them, to the framework of the backrest and, in the case of others, directly or indirectly to the subframe itself. This articulation of any known conventional type apart from the folding-down indicated previously, also, if need be, allows modification of the relative inclination of the cushion of the backrest with respect to the cushion of the seat part, whether such a modification in inclination is continuous or discontinuous, and whether it is done about an axis coincident with the axis 300 or different from the latter. As is known, a catch 31 makes it possible to hold the backrest cushion in its first, upright, position whilst permitting, if need be, an adjustment of the inclination. The operation of the catch 31 is provided by an appropriate control of any known type, for example having cable and sheath of the Bowden type or with linkages, connected to a knob situated on the outer side of the backrest practically halfway up the height of the latter, as is conventional.

The frameworks, cushions and articulation are of any conventional common type usually used especially on board motor vehicles. That is why these will not be expanded upon more fully.

Figure 6:
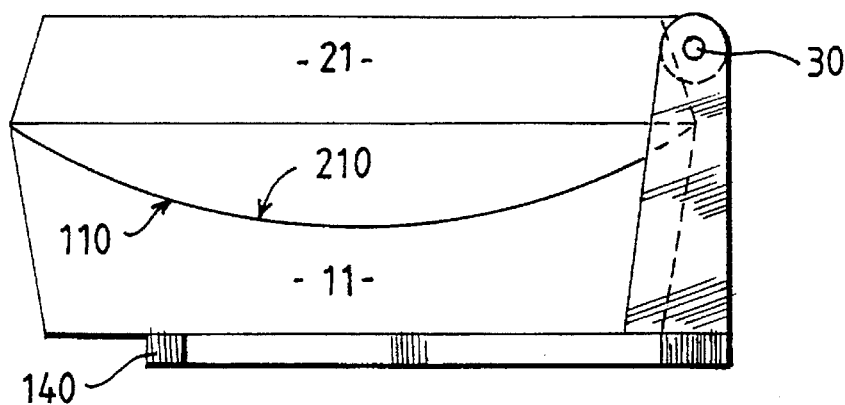
FIG. 6 is a view analogous to that of FIG. 4 of the embodiment of FIG. 5.

It will be observed that the cushions 11 and 21, respectively of the seat part and of the backrest, each comprise a middle supporting face 111 and 211 which is specific to them and lateral padded rolls 112 and 212 which border each of them. As can be observed, the middle supporting face 111 and the lateral padded rolls 112 of the seat part 10 cushion 11 delimit a surface 110 which is conjugate with a complementary surface 210 which is delimited by the middle supporting face 211 and the lateral padded rolls 212 of the backrest 20 cushion 21. Thus, as can be observed particularly in FIGS. 4, 6 and 7 of the drawing, when the seat part 10 cushion 11 occupies its turned access position and the backrest 20 cushion 21 occupies its second, folded-down, position, the corresponding surfaces 110 and 210 respectively of the seat part 10 cushion 11 and of the backrest 20, cushion 21 fit against one another. It will be observed that such fitting may take place practically entirely and without overlap, as illustrated in FIG. 6, or even with at least partial overlap of one or other of the backrest and seat part cushions, as illustrated in FIGS. 4 and 7. One type of surface 110, 210 which is suitable is the hyperbolic paraboloid, for example.

If need be, the device 40 returns the seat part cushion into one or other of its normal or turned positions and, preferably, to its normal road-going position. This return device may be totally automatic and operate, for example, by means of gravity as indicated in document U.S. Pat. No. 3,207,464, (whose disclosure is expressly incorporated herein by reference) mechanical, with the aid of a spring, or controlled, for example, by a pneumatic, hydraulic, or electric route.

Preferably, the automatic-control device 50 allows the rotation of the seat part cushion to be brought about on the occasion of the backrest cushion being folded down. In such a case, the automatic-control device 50 preferably also acts on the lock 15 and, if need be, on the catch which immobilizes the slideways especially the memory-type slideways, and the lock which allows the subframe to be kept on the flooring when the latter is equipped with a connection which allows it to be tipped forwards.

In all cases where it is necessary the lock 15 and catch 31 are interconnected in any conventional appropriate manner so that the enabling of the catch produces that of the lock.

FIG. 8 diagrammatically illustrates one embodiment of a mechanical automatic-control device 50. Such an automatic-control device comprises a connection 51, here mechanical, made of pulleys, smooth or toothed, and return rollers 511 as well as a toothed or untoothed belt, chain or cable 512. As can be seen clearly in this figure, one of the pulleys 511 is keyed on to the frame-work 22 of the backrest if necessary by interposition of a flange of the articulation so as to follow it during its folding-down and/or change in inclination, and vice versa, and another pulley 511 keyed on to the moving element 132 of the turntable 13. It is therefore understood that any rotation of the backrest cushion and/or of its framework is of the sort transmitted to the seat part cushion, the framework of which is secured to the moving element of the turntable.

Figure 9:
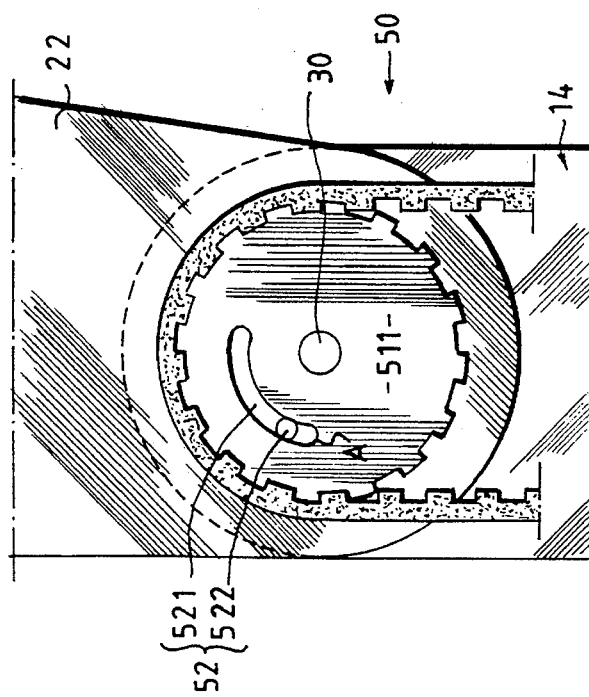
Figure 11:
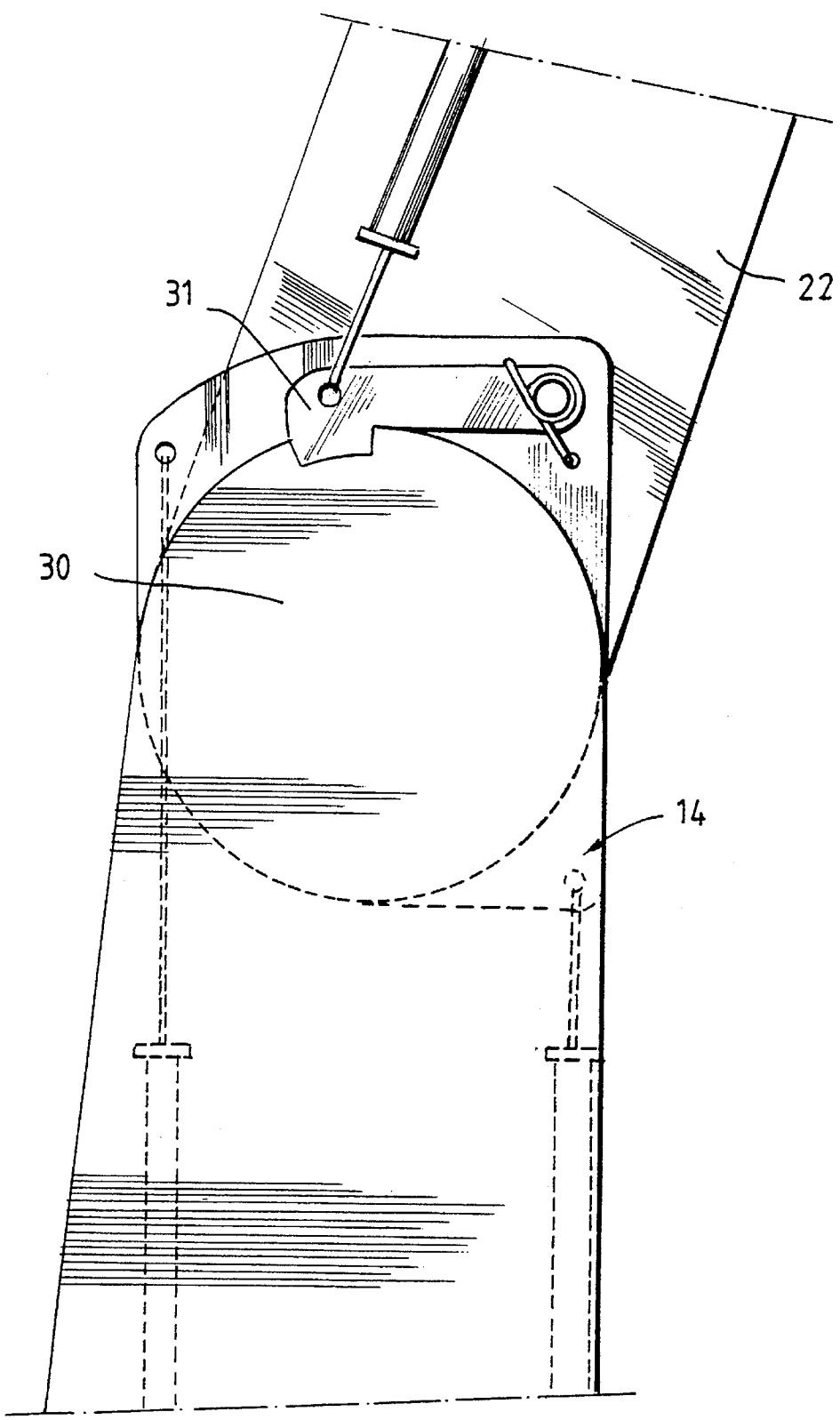
FIG. 11 is a diagrammatic partial side view of a part of a seat according to the invention.

When the backrest cushion is capable of assuming an adjustable inclination independently of its being folded down, the initial position of the cushion, prior to it being folded down, is, in general, such that when the backrest cushion pivots about the axis 300 between its two, upright and folded-down, positions, the arc which it describes is always greater than that which the seat part cushion describes when it passes from its normal position to its turned position, or vice versa. In order to take account of this, the automatic-control device 50 is preferably provided with a compensator 52. Such a compensator is illustrated in FIG. 9. In this figure, the orientation adopted is such that the rear of the backrest or of the seat is situated, to the right when considering this view, the folding-down of the backrest cushion against the seat part cushion then taking place in the anticlockwise direction. This compensator comprises a slit 521, in the shape of a circular arc, formed in the pulley 511 mounted loosely on the articulation spindle 300, and a stub 522 engaged in this slit and secured to the framework 22 or to the flange of the articulation which is associated with it. It is therefore understood that the rotation of the backrest cushion causes the pulley 511 to turn only when the stub 522 arrives at the end A of the slit 521. When the backrest cushion continues its displacement, the pulley turns and then entrains the seat part cushion which pivots, after having been unlocked, through an angle which corresponds exactly to the gap between the two, normal and turned, positions, by virtue of the suitably chosen respective positions of the end A of the slit 521 and of the stub 522. The length of the slit 521 is calculated so as to allow angular adjustment of the backrest, when the seat is in the road-going position, without it exerting an action on the pulley 511 connected to the articulation. Conversely, during the manoeuvre of bringing the backrest up, it is the device 40 which automatically places the seat part back in its normal position.

Figure 10:
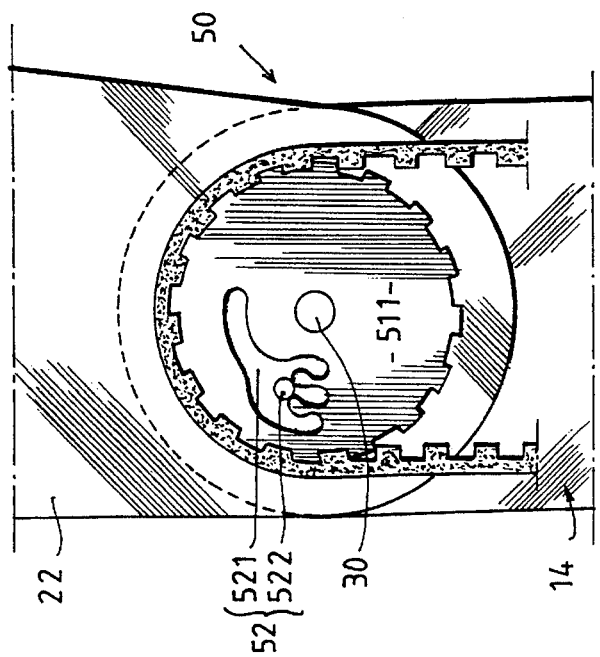
FIGS. 9 and 10 are diagrammatic detailed partial side views of a part of a seat according to the invention.

FIG. 10 illustrates another type of compensator equipped this time with an escapement mechanism. The orientation adopted for this figure is the same as that for FIG. 9. As can be seen, one of the ends of the slit is equipped with two elastic fingers, for example in the shape of a lyre or clip, which are capable momentarily of trapping the stub 522 when it arrives at this end of the slit, gripped as it is by the lyre-shaped clip. The stub follows the pulley for as long as there is not sufficient resistance, in the appropriate direction, in order to dislodge it from the clip. There is no need in this case to call upon the device 40 because when the backrest is brought back up this backrest places the seat part back in the normal position, the stub then being trapped in the lyre, then continues its rotation after escapement of the stub from the lyre until it regains its normal position. For the rest, the operation of this compensator is similar to the one illustrated in FIG. 9.

It is also possible, for reasons of simplicity, to dispense with the type of compensator described hereinabove. The pulley 511 is then rotationally connected to the articulation spindle 300 of the backrest and no longer has a slit. When the backrest pivots it immediately entrains the rotation of the seat part. In order to take account of the angular travel of the backrest which is greater with respect to that of the seat part, there is interposed between that one of the pulleys 511 which beforehand was keyed on to the moving element 132 of the turntable 13, a conventional appropriate friction-type device, not represented. In this way, the angular travel of the backrest is manifested, in both directions of rotation, in a complete rotation of the seat part between its two, normal and turned, positions. This same friction-type device also permits conventional angular adjustment of the backrest.

The constituent parts of a seat according to the invention are joined together, assembled, and fitted as appears clearly in the figures of the drawing.

For the rest of the explanation, we will be led to consider the following two cases. Firstly, the operation intended to make it easier for the user to get into the seat or to get out of this seat will be described. Next, the operation intended to allow easy access to the rear of the seat and the use which can be made of this seat when its backrest is in the position in which it is folded down against the seat part will be described.

In the first case, it is clear that only the cushion of the seat part must turn, independently of the backrest. This is obtained naturally in the absence of the automatic-control device 50. If, on the other hand, the presence of an automatic-control device has been adopted, it is necessary to make use of a disengagement means of any appropriate conventional type taking it out of service at least momentarily during this phase.

It is assumed that a seat according to the invention is initially in the situation in which it is illustrated in FIGS. 1 and 2. It can therefore be seen that the lateral padded rolls of the cushions are parallel to the longitudinal axis of the vehicle, that is to say that these padded rolls are practically orthogonal to the direction of access to the seat which makes it possible to sit therein or get out thereof, and constitute an impediment.

When the seat part cushion has turned through approximately a quarter of a turn, as illustrated for example in FIG. 3, it can then be seen that its lateral padded rolls are practically parallel with the direction allowing one to get into or out of the seat, and that these padded rolls therefore no longer hinder. Bringing the seat part cushion into the turned access position may be obtained automatically, for example, when enabling the locks locking the doors or when opening one of these. Once an occupant is seated on the cushion, he turns the seat part into the normal road-going position by a movement of the body or even with the aid of an appropriate control, motorized if need be, and this seat part resumes its normal road-going position, in which it is immobilised by the lock.

In order to get out of the vehicle, it is sufficient to proceed in the reverse manner, in order to pass the seat part cushion from its normal road-going position to its turned access position.

If now one wishes to gain access to the rear of the seat, the latter not being occupied, the seat part cushion is turned manually or automatically from its normal road-going position to its turned access position if it did not already occupy this latter position, then the backrest cushion is folded down against the seat part cushion, or it is then the automatic-control device 50 which carries out all of these movements.

The respective lateral padded rolls of the cushions of the seat part and of the backrest instead of opposing each other by abutting against each other, because instead of being "parallel" they are now "orthogonal" or intercrossed, find their place in the hollow parts of the surface opposite, and also permit the backrest to be folded down through a right angle, or even more; this brings the cushion of the backrest from its first upright position into its second folded-down position, for which the backrest cushion is practically horizontal against the seat part cushion. This horizontality especially of the rear part of the backrest, is obtained if need be by a suitable arrangement of the conjugate complementary shapes of the surfaces of the seat part and backrest cushions which imbricate in one another and, if necessary, by a suitable choice of their individual axes of rotation.

This results in maximum "compacting" of the seat which is therefore folded up into a particularly closed up shape and is conducive to access to a volume located behind it. This convenience of access may be further improved if this mutual fitting of the backrest cushion and of the seat part cushion, after their respective rotation and folding-down, is associated with the whole of the seat advancing towards the dashboard by virtue of its slideways, said to be of the memory type, and possibly in conjunction with a tilting forwards.

It will be observed that by virtue of the practically perfect horizontality of the rear part of the backrest, which allows the backrest and seat part cushions to be imbricated, that this rear part may be used in order to make it fulfil the role of a small table or low table, provided that this rear part has the required rigidity.

It may therefore seen that a seat according to the invention makes it possible to facilitate access to the seat in order to get into it or out of it, and also makes it possible to improve access to the volume located behind the seat in question and, in addition, owing to the imbrication obtained of the backrest and seat part cushions, also makes it possible to gain space and if necessary to convert the rear part of the backrest into a surface which can be used in the manner of a small table.

Such a seat according to the invention is equally suitable for the front seats and for the rear seats of a land-based motor vehicle, particularly of the type known as a "touring vehicle".

The foregoing shows the benefit of the invention and explains the advantages which it affords.

We claim:

1. A bucket seat for a land-based motor vehicle, comprising a seat part (10) with a cushion (11) carried by a framework (12) mounted on a subframe (14), a backrest (20) with a cushion (21) carried by a framework (22), and an articulation (30) connecting the subframe (14) of the seat part (10) to the framework (22) of the backrest (20) in order to allow the cushion (21) of the backrest (20) to be pivoted about an axis (300) between a first, upright position and a second, folded-down position in which the cushion (21) of the backrest (20) is against the seat part cushion (11), wherein the framework (12) of the seat part (10) cushion (11) is mounted on the subframe (14) by the interposition of a turntable (13) so that the seat part cushion (11) can turn about an axis (130) not parallel to the axis (300) of pivoting of the backrest cushion (21), between a normal position and a turned access position, wherein the seat part and backrest cushions (11,21) each comprise a middle supporting face (111,211) and lateral padded rolls (112,212) which border it for holding an occupant of the seat when he is subjected to transverse or lateral forces, and wherein the middle supporting face (111) and the lateral padded rolls (112) of the seat part cushion (11) delimit a surface (110) which is conjugate with a complementary surface (210) delimited by the middle supporting face (211) and the lateral padded rolls (212) of the backrest cushion (21) so that, when the seat part cushion (11) occupies its turned access position, and the backrest (20) cushion (21) occupies its second, folded-down position, the corresponding surfaces (110,210) of the seat part (10) cushion (11) and of the backrest (20) cushion (21) fit at least partially into one another; and wherein the bucket seat further comprises automatic-control means (50), connected to said turntable (12) and to said framework (22) of the backrest (20), for automatically controlling turning of the seat part cushion (11) from its normal position to its turned access position upon pivoting of the backrest cushion (21) from its first, upright position to its second, folded-down position.

2. The seat according to claim 1, further comprising means (40) for returning the seat part cushion (11) from its turned access position to its normal position.

3. The seat according to claim 1, further comprising a lock (15), mounted on the subframe (14) of the seat part (10), for immobilizing the seat part cushion (11) in its normal position.

4. The seat according to claim 1, wherein the articulation (30) comprises a catch (31) for immobilizing the backrest cushion (21) in its first, upright position.

5. The seat according to claim 1, further comprising a lock (15), mounted on the subframe (14) of the seat part (10), for immobilizing the seat part cushion (11) in its normal position, wherein the articulation (30) comprises a catch (31) for immobilizing the backrest cushion (21) in its first, upright position, and wherein the lock (15) and catch (31) are interconnected via said automatic means (50) so that releasing of the catch (31) also releases the lock (15).

6. The seat according to claim 1, wherein the subframe (14) is equipped with at least one slideway (141,142) including releasable immobilizing means for immobilizing the slideway (141, 142), and wherein the automatic-control means (50) control the release of the immobilizing means in order to allow the slideway to slide completely forwards when the backrest cushion (21) is in said second folded-down position.

7. The seat according to claim 6, wherein the slideway (141,142) is a slideway with memory of the setting position which the slideway had before release of the immobilizing means.

* * * * *